UNITED STATES PATENT OFFICE 2,265,196

CONCEALED MARKER FOR ALCOHOLS AND METHOD OF IDENTIFICATION THEREOF

Charles H. Riley, St. George, Staten Island, N. Y., assignor to the Government of the United States as represented by the Secretary of the Treasury No Drawing. Application April 30, 1940,
Serial No. 332,616

24 Claims. (Cl. 252—366)

(Granted under the act of March 3, 1883, as amended April 30, 1928; 370 O. G. 757)

The invention relates to denatured alcohols and more particularly to certain alcohol compositions containing a concealed marker according to this invention and to a method of identifying these compositions.

Heretofore various denaturing substances have been added to ethyl alcohol, to prevent it from being diverted from industrial purposes to beverage purposes. While the denaturant has no undesirable effect on industrial processes it is extremely distasteful if used internally.

However, as is well known to those familiar with this subject, methods of "cleaning" or removing these denaturants from the alcohol have been devised and are illegally employed from time to time to produce beverage alcohol from commercial alcohol to avoid payment of legal taxes. In some cases it is difficult or impossible to determine by chemical analysis whether or not the sample seized for analysis is derived from denatured alcohol.

Since large quantities of denatured alcohol are produced throughout the country, it is particularly desirable from the standpoint of evidence to be able to distinguish the "cleaned" denatured industrial alcohols from other alcohols.

Accordingly, it is an object of this invention to provide a novel and efficient method for identifying alcohols from which the approved denaturing materials may or may not have been removed.

Another object of the invention is to provide an improved alcohol composition containing a concealed marker which does not possess objectionable taste or odor in the quantity required, and which in itself is preferably non-poisonous, and which, when added to the alcohol can not be removed.

A further object of the invention is to provide a method of testing this improved denatured alcohol whereby positive identification of the nature of the alcohol, or type of denatured alcohol, may be obtained even though certain of the main denaturants have been illegally removed.

In accordance with the invention these and other objects are attained by adding to the denatured alcohol one or more miscible aliphatic diethers which have a boiling point within a range close to the boiling point of the denatured alcohol composition. These aliphatic diethers can not be removed or chemically altered by the usual "cleaning" methods which are illegally employed to remove the denaturant and hence they serve as a "marker" or identifying substance to indicate that the "cleaned" alcohol is actually recovered denatured alcohol. By an appropriate chemical analysis, described hereinafter, the "marker" can be separated and identified. This will clearly differentiate the "cleaned" denatured alcohol from an undenatured distilled alcohol and will enable its source to be more readily discoverable by government agents.

While other miscible aliphatic diethers might be employed, such as propylene glycol dimethyl ether, I preferably employ a glycol dimethyl ether ($CH_3O$—$CH_2CH_2$—$OCH_3$) B. P. 84° C. or glycol methyl ethyl ether, ($CH_3O$—$CH_2CH_2$—$OC_2H_5$) B. P. 101.5° C. or a mixture thereof as the "marker" material.

I have found that glycol dimethyl ether and glycol methyl ethyl ether are very suitable as markers. These materials in minor proportions do not alter the characteristics such as color, odor, or taste of the alcohol; do not irritate the skin; have solvent properties similar to alcohol; cannot be removed from alcohol, or denatured alcohol, by treatment with mineral oils, activated carbon, dilution with water or by treatment with acids, alkalis, or other chemicals; and do not interfere with the legitimate uses of such alcohol in the arts and industries. In addition to the advantages enumerated above, these glycol ethers do not react or otherwise interfere with any of the approved denaturants now used in denatured alcohol formulas.

The following are examples of industrial alcohols containing standard denaturants and my preferred "marker" materials.

*Example I*

| | Gals. |
|---|---|
| Ethyl alcohol | 100 |
| Denaturant | X |
| "Marker" glycol dimethyl ether | 1/8–1 |

*Example II*

| | Gals. |
|---|---|
| Ethyl alcohol | 100 |
| Denaturant | X |
| "Marker" glycol methyl ethyl ether | 1/8–1 |

*Example III*

| | Gals. |
|---|---|
| Ethyl alcohol | 100 |
| Denaturant | X |
| "Marker": | |
| Glycol dimethyl ether 4 parts } Glycol methyl ethyl ether 1 part } | 1/8–1 |

In the above examples, any of the standard denaturants approved by the United States Treasury Department, Bureau of Internal Revenue, such as ethyl acetate, brucine sulfate, benzol, or diethylphthalate may be employed singularly or in suitable combinations, in appropriate amounts.

It will be understood that a uniform solution of these constituents can be obtained by thorough mixing. While the above compositions may be satisfactorily employed, it will be understood that they are given simply for illustration and that the invention contemplates considerably wider variations in proportions of the constituents.

Also, while the invention is illustrated by describing its use with ethyl alcohol, it will be understood that my preferred "marker" materials may be used with other alcohols such as methyl, propyl or butyl alcohols if it is desired to identify their particular source of manufacture or may be employed in ethyl alcohol containing no denaturants.

I have successfully removed the standard denaturants from the above described compositions by physical and chemical treatments but for obvious reasons I do not wish to set forth in detail the methods used since the purpose of the invention is to prevent rather than to encourage commercial alcohol cleaning. However, in all cases the "cleaned" alcohol contained my preferred "markers" in unchanged form. I then may test for the "markers" in accordance with the following method:

Reagents: 1. Oxidizing solution— To 700 cc. of water add 100 grams $K_2Cr_2O_7$ and 150 cc. of conc. $H_2SO_4$. Cool to room temperature and make up to 1000 cc. with water.

2. Reagents used in modified Deniges test for methanol. (Methods of Analysis, Association of Official Agricultural Chemists, page 174, fourth edition, 1935.)

Place 100 cc. of oxidizing solution in a 500 cc. Erlenmeyer flask and add exactly 2 cc. of the high proof alcohol to be tested. Mix the contents and close the flask with a rubber stopper. After 20 minutes remove the stopper to equalize the pressure, replace the stopper and carefully invert the flask in such a manner that the entire interior of the flask is washed with the oxidizing solution. After 5 more minutes have elapsed, again invert the flask to wash the entire interior with oxidizing solution.

After 30 minutes or more of oxidation, remove the stopper, distill the contents of the flask and collect the first 6–8 cc. of distillate in a test tube. Place ½ of the distillate (3–4 cc.) in a second test tube and add 1 cc. of the $KMnO_4$ solution. After 15 minutes add 1 cc. of the oxalic acid solution and shake the test tube until the contents become perfectly clear. Add 2 cc. of Schiffs reagent, mix the contents thoroughly and examine for a purple color after 15 and 30 minutes.

Note 1. Although reagents used in detecting methanol in alcohol are employed, methanol is completely oxidized beyond the formaldehyde stage by the $K_2Cr_2O_7$ solution, and gives a negative test.

2. The "markers" when present in alcohol do not interfere with the modified Deniges test for methanol in alcohol.

It is to be understood that the specific examples and compositions that have been described above are for the purpose of illustrating the invention. It is also to be understood that the invention is not to be limited to these examples but that various modifications may be made therein without departing from the scope of the invention which is to be limited only by the claims appended hereto.

The invention described herein, if patented, may be manufactured and used by or for the Government for governmental purposes without the payment to me of any royalty thereon.

What is claimed is:

1. A method of subsequently identifying and tracing denatured alcohol which comprises forming a composition of matter by adding a "marker" comprising an aliphatic diether, which contains at least one methoxy group, to the denatured alcohol at the source of manufacture and subsequently testing for the "marker" after the denatured alcohol has left the source of manufacture by taking a test sample of said composition and removing the alcohol therefrom, by means of sodium or potassium bichromate dissolved in dilute sulphuric acid solution, without affecting the "marker" and then testing the distillate from said alcohol free sample to determine the presence of the "marker" by converting the "marker" to formaldehyde.

2. A method of subsequently identifying and tracing alcohol which comprises forming a composition of matter by adding a "marker" comprising an aliphatic diether, which contains at least one methoxy group, to the alcohol at the source of manufacture and subsequently testing for the "marker" after the alcohol has left the source of manufacture by taking a test sample of said composition and removing the alcohol therefrom, by means of sodium or potassium bichromate dissolved in dilute sulphuric acid solution, without affecting the "marker" and then testing the distillate from said alcohol free sample to determine the presence of the "marker" by converting the "marker" to formaldehyde.

3. Ethyl alcohol containing, as an essential "concealed marker" indicative of the source of the alcohol, a quantity of a straight-chain aliphatic diether insufficient in amount to itself materially alter the color, odor or taste of the alcohol, but detectable chemically on destruction of the alcohol to identify its source.

4. Denatured ethyl alcohol containing, as an essential "concealed marker" indicative of the source of the alcohol, a quantity of a straight-chain aliphatic diether insufficient in amount to itself materially alter the color, odor or taste of the alcohol, but detectable chemically on destruction of the alcohol to identify its source.

5. Ethyl alcohol containing, as an essential "concealed marker" indicative of the source of the alcohol, a quantity of a straight chain 1,2-dialkoxy ethane insufficient in amount to itself materially alter the color, odor or taste of the alcohol, but detectable chemically on destruction of the alcohol to identify its source.

6. Denatured ethyl alcohol containing, as an essential "concealed marker" indicative of the source of the alcohol, a quantity of a straight chain 1,2-dialkoxy ethane insufficient in amount to itself materially alter the color, odor or taste of the alcohol, but detectable chemically on destruction of the alcohol to identify its source.

7. Ethyl alcohol containing, as an essential "concealed marker" indicative of the source of the alcohol, a quantity of glycol dimethyl ether insufficient in amount to itself materially alter the color, odor or taste of the alcohol, but detectable chemically on destruction of the alcohol to identify its source.

8. Denatured ethyl alcohol containing, as an essential "concealed marker" indicative of the source of the alcohol, a quantity of glycol dimethyl ether insufficient in amount to itself materially alter the color, odor or taste of the alcohol, but detectable chemically on destruction of the alcohol to identify its source.

9. Ethyl alcohol containing, as an essential "concealed marker" indicative of the source of the alcohol, a quantity of glycol methyl ethyl ether insufficient in amount to itself materially alter the color, odor or taste of the alcohol, but detectable chemically on destruction of the alcohol to identify its source.

10. Denatured ethyl alcohol containing, as an essential "concealed marker" indicative of the source of the alcohol, a quantity of glycol methyl ethyl ether insufficient in amount to itself materially alter the color, odor or taste of the alcohol, but detectable chemically on destruction of the alcohol to identify its source.

11. Ethyl alcohol containing, as an essential "concealed marker" indicative of the source of the alcohol, a quantity of mixed glycol dimethyl ether and glycol methyl ethyl ether insufficient in amount to itself materially alter the color, odor or taste of the alcohol, but detectable chemically on destruction of the alcohol to identify its source.

12. Denatured ethyl alcohol containing, as an essential "concealed marker" indicative of the source of the alcohol, a quantity of mixed glycol dimethyl ether and glycol methyl ethyl ether insufficient in amount to itself materially alter the color, odor or taste of the alcohol, but detectable chemically on destruction of the alcohol to identify its source.

13. Ethyl alcohol containing, as an essential "concealed marker" indicative of the source of the alcohol, a quantity of 1,2-dimethoxy propane insufficient in amount to itself materially alter the color, odor or taste of the alcohol, but detectable chemically on destruction of the alcohol to identify its source.

14. Denatured ethyl alcohol containing, as an essential "concealed marker" indicative of the source of the alcohol, a quantity of 1,2-dimethoxy propane insufficient in amount to itself materially alter the color, odor or taste of the alcohol, but detectable chemically on destruction of the alcohol to identify its source.

15. Ethyl alcohol containing, as an essential "concealed marker" indicative of the source of the alcohol, a quantity of propylene glycol dimethyl ether insufficient in amount to itself materially alter the color, odor or taste of the alcohol, but detectable chemically on destruction of the alcohol to identify its source.

16. Denatured ethyl alcohol containing, as an essential "concealed marker" indicative of the source of the alcohol, a quantity of propylene glycol dimethyl ether insufficient in amount to itself materially alter the color, odor or taste of the alcohol, but detectable chemically on destruction of the alcohol to identify its source.

17. A method of tracing alcohol which consists in adding to the alcohol at a source of distribution as an essential "concealed marker," a quantity of a straight chain aliphatic diether insufficient in amount to materially alter the color, odor, or taste of the alcohol, but detectable chemically on destruction of the alcohol; and subsequently identifying the alcohol with its source by destroying a sample of the alcohol and detecting the concealed marker.

18. A method of tracing denatured alcohol which consists in adding to the alcohol at a source of distribution as an essential "concealed marker," a quantity of a straight chain aliphatic diether insufficient in amount to materially alter the color, odor, or taste of the alcohol, but detectable chemically on destruction of the alcohol; and subsequently identifying the alcohol with its source by destroying a sample of the alcohol and detecting the concealed marker.

19. A method of tracing alcohol which consists in adding to the alcohol at a source of distribution as an essential "concealed marker," a quantity of glycol dimethyl ether insufficient in amount to materially alter the color, odor, or taste of the alcohol, but detectable chemically on destruction of the alcohol; and subsequently identifying the alcohol with its source by destroying a sample of the alcohol and detecting the concealed marker.

20. A method of tracing alcohol which consists in adding to the alcohol at a source of distribution as an essential "concealed marker", a quantity of glycol methyl ethyl ether insufficient in amount to materially alter the color, odor, or taste of the alcohol, but detectable chemically on destruction of the alcohol; and subsequently identifying the alcohol with its source by destroying a sample of the alcohol and detecting the concealed marker.

21. A method of tracing alcohol which consists in adding to the alcohol at a source of distribution as an essential "concealed marker", a quantity of mixed glycol dimethyl ether and glycol methyl ethyl ether insufficient in amount to materially alter the color, odor, or taste of the alcohol, but detectable chemically on destruction of the alcohol; and subsequently identifying the alcohol with its source by destroying a sample of the alcohol and detecting the concealed marker.

22. A method of tracing alcohol which consists in adding to the alcohol at a source of distribution as an essential "concealed marker", a quantity of propylene glycol dimethyl ether insufficient in amount to materially alter the color, odor, or taste of the alcohol, but detectable chemically on destruction of the alcohol; and subsequently identifying the alcohol with its source by destroying a sample of the alcohol and detecting the concealed marker.

23. A method of secret marking of alcohols which consists in adding to an alcohol at a source of distribution, as an essential "concealed marker," a quantity of a straight chain aliphatic diether insufficient in amount to itself materially alter the color, odor or taste of the alcohol, said marker being incapable of removal from the alcohol by any known method without destroying the alcohol, but being detectable chemically on destruction of the alcohol.

24. A composition of matter including, in combination, a beverage alcohol, a denaturant for rendering said beverage alcohol unfit for human consumption, and a concealed identifying ingredient for identifying said beverage alcohol when said denaturant may have been illegally removed, said denaturant being objectionable to the human senses when imbibed, and said concealed identifying ingredient consisting of a quantity of an aliphatic diether in the neighborhood of less than one percent of the composition by volume which can be detected chemically after distribution of the beverage alcohol but which does not noticeably affect the color, odor or taste of the beverage alcohol and cannot be removed therefrom by known methods without destroying the beverage alcohol.

CHARLES H. RILEY.